United States Patent [19]

Lansbury et al.

[11] 4,252,851

[45] Feb. 24, 1981

[54] MULTIPLE-LAYER FILMS

[75] Inventors: Robert C. Lansbury, St. Albans; Thomas G. Heggs, Welwyn, both of England

[73] Assignee: Imperial Chemical Industries Limited, London, England

[21] Appl. No.: 8,110

[22] Filed: Jan. 31, 1979

Related U.S. Application Data

[63] Continuation of Ser. No. 585,866, Jun. 11, 1975, abandoned, which is a continuation-in-part of Ser. No. 538,878, Jan. 6, 1975, abandoned.

[30] Foreign Application Priority Data

Mar. 29, 1974 [GB] United Kingdom .............. 13995/74
Nov. 11, 1974 [GB] United Kingdom .............. 48422/74

[51] Int. Cl.$^3$ ....................... B32B 27/00; B32B 27/08
[52] U.S. Cl. .................... 428/336; 428/334; 428/347; 428/349; 428/500; 428/516
[58] Field of Search .............. 428/500, 516, 515, 334, 428/336, 349, 347; 156/306, 344; 526/348.6, 339

[56] References Cited

U.S. PATENT DOCUMENTS

| | | | |
|---|---|---|---|
| 2,918,457 | 12/1959 | Jezl | 526/348.6 X |
| 3,112,300 | 11/1963 | Natta et al. | 528/490 X |
| 3,112,301 | 11/1963 | Natta et al. | 528/490 X |
| 3,246,061 | 4/1966 | Blatz | 428/349 |
| 3,508,944 | 4/1970 | Henderson et al. | 428/346 |
| 3,540,979 | 11/1970 | Hughes | 428/516 |
| 3,620,825 | 11/1971 | Lohmann | 428/336 |

FOREIGN PATENT DOCUMENTS

| | | |
|---|---|---|
| 775184 | 1/1968 | Canada . |
| 16-7079 | 4/1941 | Japan . |
| 16-19350 | 11/1941 | Japan . |
| 16-19437 | 11/1941 | Japan . |
| 46-5957 | 2/1971 | Japan . |
| 47-39225 | 10/1972 | Japan . |
| 48-44667 | 12/1973 | Japan . |
| 1018341 | 1/1966 | United Kingdom . |
| 1074064 | 6/1967 | United Kingdom . |
| 1096064 | 12/1967 | United Kingdom . |

OTHER PUBLICATIONS

J. Polymer Science, 4, 2563-2582, (1966), "Costereosymmetric d-Olefin Copolymers".
"Polymer", 17, No. 1, 30-33, (1966).
"Manual of Plastics Packaging Materials", 3rd Edition, 1968, pp. 377-379.
"Modern Plastics International", Jun. 1971, pp. 52, 53.
JPI-Journal, 6, Aug. 1968, pp. 51-56.
"Modern Plastics", 78-80, Jun. 1968.
Supplement to Kagaku Kogyo 11, 4, (1967).

Primary Examiner—Lorraine T. Kendell
Attorney, Agent, or Firm—Cushman, Darby & Cushman

[57] ABSTRACT

A multiple-layer film having a substrate layer of high density polyethylene or a propylene homo- or co-polymer, and, on at least one surface of the substrate, a heat-sealable layer of a propylene co-polymer containing from 80 to 95% of propylene, the balance being a $C_4$ to $C_{10}$ olefin. The substrate and surface layers exhibit a monoclinic crystalline structure.

8 Claims, 6 Drawing Figures

MULTIPLE-LAYER FILMS

This is a continuation of application Ser. No. 585,866, filed June 11, 1975, now abandoned; which in turn is a continuation-in-part of Ser. No. 538,878, filed Jan. 6, 1975, now abandoned.

This invention relates to thermoplastic films, and particularly to multiple-layer thermoplastic films.

For many applications, films are required which exhibit a combination of properties unattainable in a single film. For example, a film suitable for use in packaging foodstuffs or the like may be required to exhibit a combination of heat-sealability, tensile strength, transparency and vapour permeability which cannot be achieved in a homogeneous film.

In an attempt to achieve a desirable combination of properties, films have hitherto been prepared from homogeneous blends of two polymers, but the inherent properties of each polymer are usually altered to such an extent, as a result of the blending, that the desired combination of properties is seldom achieved.

Another way in which desired properties may be attained is to form a laminated structure in which two or more layers of polymeric material are adhered together. Thus, two or more layers of preformed film may be bonded together by means of a suitably adhesive interlayer, or a preformed film may be coated on one or both surfaces with a layer of polymeric material applied as a melt, or, alternatively, as a solution or dispersion in a suitably volatile solvent or dispersant.

Particularly in the field of packaging films is it desirable to provide a heat-sealable film, which can be subjected to temperatures at which the film can be sealed to itself without impairment of the film integrity. This is conveniently achieved by providing on a film substrate a layer of heat-sealable material which adheres securely to the substrate, and which can be melted at a temperature below that at which the film substrate begins to soften. Naturally, the lower the melting temperature of the heat-sealable coating, the less danger there is of the film substrate sustaining damage during the heat-sealing operation. For example, cockling of the film in the region of the heat-seal is a defect which arises because of undue thermal shrinkage of the substrate.

Modern techniques for packaging a variety of products, such as potato crisps, nuts, sugar confectionery, biscuits and similar snack foods, nuts, bolts, screws, nails, rivets, and the like, frequently involve the formation of a package, by creating a heat-seal between two opposed layers of a packaging film, and the substantially simultaneous introduction into the newly-formed package of the desired product. Thus, in the so-called vertical "form and fill" packaging technique a continuous flat web of packaging film is fed around a "forming shoulder" where it is shaped into tubular form, and thence over a hollow internal mandrel or cylindrical former where the free longitudinal edges of the film are sealed together to create a continuous tubular film. The tubular film then passes between a pair of intermittently co-operating heated sealing jaws which create a series of discrete packages by collapsing the tubular film and forming a succession of horizontal heat-seals, usually crimp seals, across the width of the film, the desired quantity of product being introduced into each package through the internal mandrel in the interval between the formation of successive horizontal heat-seals. At high operating speeds the product is introduced into the package substantially simultaneously with the creation of the lower horizontal heat-seal, and to avoid rupture of the package it is therefore essential that the inherent strength of the lower heat-seal should, before dissipation of all the thermal energy applied to create the heat-seal, rapidly reach a level sufficient to support and retain the product introduced into the package. Thus, the packaging film should desirably exhibit a high "hot seal strength".

It has been suggested that a high molecular weight, entirely crystalline copolymer of propylene and butene-1, containing from 25 to 80 mole % of butene-1, and prepared by polymerising a mixture of the monomers in the presence of, as catalyst, a mixture of a halide of a transition metal, an organometallic derivative of aluminium or a halide of such a derivative, and an ester, amide, or ester-amide of phosphoric acid, adheres well to plastics materials to provide a readily heat-sealable coating. Such coatings are suitably applied to a substrate from solution in an organic solvent to provide a relatively thick coating layer having a coat weight of from 1.5 to 4 g/m².

It has also been proposed to form a heat-sealable film laminate by preparing two independent propylene homo- or co-polymer films, both films being formed from the same polymer, the first of the films being unnucleated, and the second of the films containing a nucleating agent such as sodium phthalate, quenching the respective films under different conditions such that the unnucleated film exhibits a monoclinic crystal structure and the nucleated film exhibits a hexagonal crystal structure pressing the films together to form a laminate, and biaxially orienting the laminate.

We have now developed a multiple-layer film which not only can be heat-sealed at desirably low temperatures and exhibits desirable adhesion between adjacent layers of the film, but which, surprisingly, is also substantially resistant to scuffing, scratching, and sticking to the jaws of heat-sealing equipment, and which is heat-sealable over a comparatively wide temperature range.

Accordingly, the present invention provides an oriented multiple-layer film comprising
  (a) a substrate layer of a polymer selected from the group consisting of,
    (1) high density polyethylene,
    (2) a propylene homopolymer, and
    (3) a copolymer of propylene with up to 15% by weight of the copolymer of an alpha-olefin containing 2 or 4 to 6 carbon atoms in its molecule, and
  (b) on at least one surface of the substrate, a heat-sealable layer of a copolymer of propylene and an alpha-olefin containing from 4 to 10 carbon atoms in its molecule, the propylene content of said heat-sealable copolymer being from 80 to 95% by weight of the copolymer,
  wherein the crystalline content of each of said propylene homo- or co-polymers forming respectively the substrate and heat-sealable layer, or layers, is of monoclinic crystalline form.

According to a preferred embodiment of the invention the thickness of the, or each, heat-sealable propylene copolymer layer does not exceed 1 micron.

High density polyethylene, i.e. polyethylene of density in excess of 0.949 g/cm³ and preferably less than 0.99 g/cm³, is a suitable substrate material, although for packaging applications a preferred substrate is a propylene homo- or block co-polymer, the latter containing, for example, up to 15% by weight of the copolymer of another copolymerisable alpha-olefin, such as ethylene, butene-1, 4-methylpentene-1, or hexene-1. The content of the other alpha-olefin is suitably from 0.25 to 15%, preferably from 0.5 to 10%, by weight of the copolymer.

Suitable monomers for copolymerising with propylene to form the heat-sealable copolymer layer of our composite or multiple-layer films include pentene-1, hexene-1, heptene-1, and decene-1, although butene-1 has proved to be a particularly suitable comonomer.

The content of the alpha-olefin monomer in the heat-sealable propylene copolymer material should not be less than 5% by weight of the weight of the copolymer, because below that content the softening temperature of the copolymer is so high as to produce a film with a very high threshold sealing temperature, i.e. the lowest heat-sealing temperature of which seals of acceptable strength are obtained. Likewise, to prevent undue disruption of the crystalline structure of the heat-sealable propylene copolymer, the content of the other alpha-olefin monomer should be maintained at a level not exceeding 20% by weight of the copolymer. In the case of a propylene/butene-1 copolymer, a butene-1 content of from about 10 to 20% by weight of the copolymer has proved especially suitable, and for application to a polypropylene substrate, we particularly prefer to employ a copolymer in which the content of butene-1 is from 10 to 15%, preferably from 11.5 to 13.5%, by weight of the copolymer.

Suitably, the heat-sealable copolymers, in granular form prior to the formation of a film layer therefrom, have a Melt Flow Index, measured in accordance with ASTM/D1238-65T (condition N) of between 10 and 400 g/10 minutes, preferably between 10 and 200 g/10 minutes, and particularly preferably between 60 and 80 g/10 minutes. Suitable copolymers, therefore, have a molecular weight (weight average) of from about 350,000 to about 120,000, and preferably from about 350,000 to about 140,000.

Although the propylene copolymers employed in the formation of the heat-sealable layer may be described as random copolymers, we believe that the copolymerisation may not be random in an exact statistical sense. Thus, although in the production of our copolymers the respective comonomers are usually fed simultaneously to a polymerisation reactor for at least a substantial part of the reaction time, it is probably easier for either the propylene or other alpha-olefin monomer units to link up to the growing polymer chain immediately adjacent to an identical monomer unit, so that there may be a tendency for short sequences of identical monomer units to form preferentially in the polymer chain.

Formation of our copolymers is conveniently effected in the presence of a "stereospecific" catalyst by which is meant a catalyst which will under equivalent conditions polymerise propylene in the absence of other monomers, to polypropylene which is at least 70% insoluble in boiling heptane. Catalysts capable of doing this comprise a transition metal compound and an organometallic activator; they are well known in the art—see for example, "Linear and Stereoregular Addition Polymers" by Gaylord and Mark, published by Interscience in 1959. Particularly useful compounds of this type are trivalent titanium compounds activated with aluminium alkyl compounds. We prefer to use titanium trichloride obtained by reduction of titanium tetrachloride either with an aluminium alkyl compound or with aluminium metal, with an aluminium alkyl halide as activator. A particularly useful and highly stereospecific catalyst is obtained by reducing titanium tetrachloride in an inert hydrocarbon diluent at a temperature of from $-20°$ C. to $+20°$ C. with an aluminium alkyl sesquichloride, preferably by adding the sesquichloride gradually to the titanium tetrachloride dissolved in the hydrocarbon, the titanium trichloride material so obtained being recovered, optionally washed or heated one or more times between 40°–150° C., or both, and used as a catalyst in the presence of an aluminium dialkyl chloride, such as diethylaluminium chloride, as activator.

Catalyst components may be introduced into the polymerization zone as solutions or suspensions in hydrocarbon diluent. Polymerization is normally carried out at temperatures of from 20° to 75° C. and may be effected in the presence of a diluent such as an inert hydrocarbon, propylene itself, or a mixture of propylene with an inert hydrocarbon.

A range of polymerisation pressures may be used, but it is necessary to control the ratio of the partial pressures of propylene and other alpha-olefin in the reaction vessel so as to produce copolymer of the required composition. Polymerisation is carried out in the absence of substantial quantities of air and water as these materials inhibit the catalysts used, but a chain transfer agent, such as hydrogen, may be present to control the molecular weight of the copolymer. When polymerisation is complete, the reaction may be stopped, for example, by adding an alcohol, such as isopropanol, and the catalyst residues removed by washing with a suitable reagent, e.g. water or more isopropanol, or mixtures of acetylacetone and lower alcohols.

The production of these copolymers may be effected by the technique disclosed in our British Pat. No. 1 084 953 for the production of propylene copolymers rich in butene-1, which disclosure is incorporated herein by reference.

Copolymers for in the production of the multiple-layer films of the present invention suitably exhibit a degree of crystallinity, as hereinafter defined, of from 35 to 65%. In the case of propylene/butene-1 copolymers we prefer that the degree of crystallinity should be within a range of from 40 to 60%, and particularly preferably within a range of from 45 to 55%.

The degree of copolymer crystallinity referred to herein is determined by a technique basically similar to that described by Natta, Corradini, and Cesari, Rend. Accad Naz. Lincei 1957, 22, 11. Thus, an X-ray diffraction scan of a copolymer sample, thermally cycled as hereinafter described, is obtained using a Philips PW 1010 diffractometer, working in transmission, with Cu-K$\alpha$ radiation and pulse height discrimination. A straight background base line is drawn in on the resultant "crystalline" diffraction spectrum between $\theta$ of 4° and 16°, where $\theta$ is the Bragg angle, and the diffraction spectrum of a 100% amorphous polypropylene sample is congruently superimposed on the "crystalline" spectrum in this region of $\theta$ so that the amorphous spectrum grazes the minimum of the "crystalline" spectrum occurring at $\theta$ of approximately 7.75°, a minimum at this point being indicative of the absence of crystalline modifications other than the alpha or monoclinic crystalline modification of polypropylene. The total area between the "crystalline" spectrum and the amorphous spectrum in the specified range of $\theta$ is equated to the intensity of crystalline scattering (C), and the area between the amorphous spectrum and the base line is equated to the intensity of amorphous scattering (A). The percentage degree of crystallinity is then defined as 100 C/(C+A), with no corrections.

The thermal history of the copolymer samples prior to determination of crystallinity is of importance, and to achieve consistent results within the aforementioned definition, samples are prepared by pressing, at 210° C., thin plates from the copolymer powder as originally made, and cooling the plate at a moderate rate. A specimen (10 mg) is cut from the plate, and placed in a standard aluminium pan (6.35 mm diameter) the latter then being placed in a cavity in a brass block sealed by a thick brass lid, the sealed block together with the lid measuring approximately 15×100×120 mm, and heated by immersion of the sealed block in an oil bath of approximately 5 liters capacity maintained at a temperature of 160° C.

Introduction of the brass block reduces the temperature of the bath, and slow heating of the bath is therefore continued until a temperature of 160° C. is recorded on a thermocouple positioned within the brass block. This final heating process occupies some 15 minutes, the desired temperature of 160° C. being reached asymptotically and the increase from 150° to 160° C. occupying a period of about 10 minutes. Cooling is then started immediately, and continued at a controlled rate of 6° C. per hour until the sample attains ambient temperature. The cooled sample is then finely chopped, and placed in a thin-walled PANTAK glass tube of 2 mm diameter for X-ray examination.

As hereinbefore described, the copolymers employed in the multiple-layer films of the present invention when examined by the aforementioned technique, before the copolymers have been incorporated into a multiple-layer film, exhibit a degree of crystallinity of from 35 to 65%. By way of comparison, a typical commercially available propylene homopolymer exhibits a degree of crystallinity, determined by the same technique, of the order of 70%.

Commercially available propylene homopolymer normally crystallises in the alpha or monoclinic form when slowly cooled, e.g. at a rate of about 6° C. per hour, from its melting temperature in the absence of added nucleating agents. Under certain extreme conditions, for example under the application of exceedingly high pressures, it has been observed that a proportion of the gamma or triclinic crystalline modification becomes associated with the normal alpha or monoclinic modification, but that on orienting the product, for example by cold drawing or by drawing from the melt, the gamma modification reverts to the alpha form so that the crystalline content of the oriented polypropylene consists substantially entirely of the alpha or monoclinic modification. It is propylene homopolymers of this kind, having a crystalline content substantially entirely of the alpha or monoclinic modification, which are intended for use in the substrate layer of the multiple-layer films of the present invention.

We have also observed that random copolymers of propylene with small proportions, e.g. up to about 20% by weight of the copolymer, of ethylene, butene-1, and higher mono-olefins, develop a relatively high proportion of the gamma crystalline form mixed with the alpha form on slow cooling from a melt. For example, a series of propylene/butene-1 copolymers, in which the content of butene-1 by weight of the copolymer ranged from about 4 to 20%, exhibited a degree of crystallinity, as hereinbefore defined, of from between about 60 and 40%, the crystalline content of the copolymers consisting essentially of a mixture of the alpha and gamma modifications, the latter constituting from about 20 to 50% of the total crystalline content. No trace of the beta or hexagonal crystal modification was observed.

X-ray diffraction examination of oriented multiple-layer films formed in accordance with the present invention, and containing one or more layers of a copolymer of the kind referred to in the immediately preceding paragraph, revealed no trace of the gamma crystalline modification, indicating that the latter had reverted to the alpha modification which constituted the entire crystalline content of the examined copolymer layers. Reference, in the present application, to an oriented multiple-layer film containing one or more layers of a propylene copolymer is indicative that the propylene copolymer is of the kind hereinbefore described having a crystalline content substantially entirely of the alpha or monoclinic crystalline modification.

Application of the heat-sealable copolymer layer onto the substrate is conveniently effected by any of the laminating or coating techniques conventionally employed in the production of composite films. Thus, preformed sheets of the substrate material and the copolymer layer may be laminated together, preferably with the use of adhesives—for example, by passing the components of the laminate together between pressure rollers maintained at suitable temperatures. Alternatively, the copolymer layer may be applied to the substrate as a solution or dispersion in a suitable, preferably hot, liquid medium, such as toluene, o, m or p-xylene, monochlorobenzene, cyclohexane, or trichloroethylene, which may subsequently be recovered and recycled for further use. Preferably, however, the heat-sealable copolymer layer is applied to the substrate by means of a melt- or extrusion-coating technique in which either a molten layer of the propylene/alpha-olefin copolymer is extruded directly onto the surface of a preformed substrate, or the polymeric components of the substrate and coating layer are coextruded under conditions such that the component layers come into contact with each other while each is still molten.

When the copolymer layer is applied to a preformed substrate, the adhesion of the applied layer to the substrate may be improved by orienting the substrate after application of the copolymer layer.

Adhesion of the heat-sealable copolymer layer to the substrate may also be improved, if desired, by the use of an intermediate anchor coating applied to the substrate prior to application of the heat-sealable copolymer layer. Suitable anchor coating materials include ethylene-vinyl acetate copolymers, or ethylenealkyl(meth)-acrylate copolymers.

However, as hereinbefore described, we prefer to employ a coextrusion technique, and when two or more molten polymeric layers are coextruded and contacted with each other while still in the molten state, the need to employ intermediate anchor coatings is obviated. Suitably, the coextrusion is effected from a multi-channel die so designed that the molten polymeric components constituting individual layers of the composite film merge at their boundaries within the die to form a single composite web which is then extruded from a common die orifice. It will therefore be understood that any reference in this specification to the propylene copolymer layer being "applied to", "provided on", or otherwise deposited on the substrate layer includes the formation of a multiple-layer film structure by the simultaneous coextrusion of the substrate layer and a propylene copolymer layer on one or each surface of the substrate layer.

Orientation of the composite films of this invention may be effected by stretching, either uniaxially, by stretching the film in one direction, or, preferably, biaxially, by stretching the film in each of two mutually perpendicular directions in the plane of the film, and the biaxial orientation may be balanced or unbalanced, for example with the higher degree of orientation of an unbalanced film in a preferred direction—usually the longitudinal or machine direction. Conveniently, the polyolefin substrate material and the heat-sealable copolymer material are coextruded in the form of a composite tube which is subsequently quenched, reheated, and then expanded by internal gas pressure to induce transverse orientation, and withdrawn at a rate greater than that at which it is extruded to stretch and orient it in the longitudinal direction. Alternatively, a flat, copolymer-coated film may be oriented by simultaneous or sequential stretching in each of two mutually perpendicular directions by means of a stenter, or by a combination of draw rolls and a stenter. When a composite, heat-sealable film is formed by bonding together two preformed films, only the substrate film need be oriented prior to the bonding operation.

The degree to which the film is stretched depends to some extent on the ultimate use for which the film is intended, but for a polypropylene-based packaging film we find that satisfactory tensile and other properties are developed when the film is stretched to between three and ten, preferably seven, times it original dimensions in each of the transverse and longitudinal directions.

After stretching, the polymeric film is normally "heat-set", while restrained against shrinkage, at a temperature above the glass transition temperature of the polymer and below its melting point. The optimum heat-setting temperature can readily be established by simple experimentation, and for a polypropylene substrate, "heat-setting" is conveniently effected at temperatures in the range of from 115° to 160° C. Heat-setting may be effected by conventional techniques—for example by means of a stenter system, or by a system of one or more heated rollers as disclosed, for example, in British Pat. No. 1 124 886.

Composite films in accordance with the present invention may be prepared in a range of thicknesses governed primarily by the ultimate application for which a particular film is to be employed. Films, having a total thickness in a range extending from 2.5 to 100 microns are of general utility, but for packaging applications we prefer to employ film of from about 10 to 50 microns in total thickness.

The ratio of substrate to copolymer layer thickness may vary within a wide range, although we prefer that the thickness of the copolymer layer should not be less than 0.2% (preferably 0.5%), nor greater than 50% of that of the substrate.

However, as hereinbefore described a multiple-layer film according to the invention and having a desirably high hot seal strength is achieved when the thickness of the propylene copolymer heat-sealable layer does not exceed 1 micron, and preferably does not exceed 0.75 micron. To ensure an acceptably high value of hot seal strength, we prefer that the thickness of the propylene copolymer heat-sealable layer does not exceed 0.5 micron, and in a particularly preferred embodiment of the present invention the thickness of this propylene copolymer layer does not exceed 0.25 micron. For a polypropylene homo- or co-polymer film substrate, the thickness of the propylene copolymer heat-sealable layer is suitably in a range of from 0.05 to 0.25 micron, preferably from 0.1 to 0.25 micron.

If desired, both of the substrate surfaces may be provided with a propylene/alpha-olefin heat-sealable layer according to the present invention, and the thicknesses of the two copolymer layers may be the same or different. For example, a substrate film of 25 microns thickness is conveniently provided with a copolymer layer of 0.75 micron thickness on one surface and with a copolymer layer of 0.25 micron thickness on the other surface. Alternatively, one surface of the substrate may be uncoated, or may be coated with a layer of a different composition depending on the properties required of the film for a particular application.

If desired, for example to improve print receptivity, the non-seal-forming surface of a multiple-layer film of the present invention may be subjected to a chemical treatment, or to a physical treatment which oxidises the surface of the film. For example, the surface may be treated with chromic acid in sulphuric acid, with hot nitric acid, or with ozone. Alternatively, the film surface may be exposed to ionising radiation, or to a thermal flame for a sufficient time to effect superficial oxidation without distortion of the surface. A preferred treatment, because of its simplicity and effectiveness, is to subject the film surface to a high voltage electric stress accompanied by corona discharge, but we have observed that such treatment tends to adversely affect the attainable hot and cold seal strengths.

One or more of the layers of the composite films of the present invention may conveniently contain any of the additives conventionally employed in the manufacture of thermoplastic films. Thus, additives such as dyes, pigments, lubricants, anti-static agents, anti-oxidants, anti-blocking agents, surface-active agents, slip aids, gloss-improvers, prodegradants, and ultra-violet light stabilisers may be employed. Films are conveniently rendered anti-static by the incorporation therein of from 0.1 to 1.0% by weight of the film of one or more substances of formula wherein $x+y$ is from 2 to 5 and R is a monovalent aliphatic radical containing from 12 to 22 carbon atoms, and from 0.01 to 0.5% based on the weight of the film of a fatty acid amide derived from a fatty acid containing from 10 to 22 carbon atoms, as disclosed in our British Pat. No. 1 034 337.

Composite films prepared in accordance with the present invention are heat-sealable at comparatively low temperatures, for example at temperatures of the order of 125° C. and lower, to provide a strong, hermetic seal. In addition, the heat-sealable coating adheres securely to the substrate material, exhibits desirable scratch- and scuff-resistance, and is resistant to sticking to the jaws of the heat-sealing equipment.

The elimination of jaw-sticking is of considerable importance to the packaging industry where the intermittent sticking of a packaging film to the jaws of heat-sealing equipment employed to form individual packages by sealing the film to itself, can impede or halt the uniform passage of film through the equipment, thereby disrupting the packaging operation. The problem is of particular concern in relation to packaging machines of the so-called vertical "form and fill" type, as hereinbefore described.

To compare the degree of jaw sticking of various films we have devised an arbitrary test employing a Woodman "Profit-Maker" (0.5 to 3.5 ounce capacity) heat-sealing machine having a pair of co-operating crimp jaws operable in a substantially horizontal plane to form heat-seals across the width of a tubular film passing vertically between the jaws. Each jaw comprises a rectangular, chromium plated, mild steel, toothed face of depth (i.e. in the vertical direction) 6.35 mm (0.25"), and width 127 mm (5"). Each face comprises a plurality of wedge shaped teeth, each of which extends continuously across the face in a vertical direction, each tooth being in the form of a frustoprism having a "head" of width 0.25 mm (0.01"), and a base or root width of 1.9 mm (0.075"), the horizontal spacing between roots of adjacent teeth being 0.127 mm (0.005"), so that the teeth are spaced apart horizontally at a density of approximately 13 teeth per 25 mm (1"). The height of each tooth, i.e. the distance by which the flat head of a tooth extends horizontally from the jaw face is 0.76 mm (0.03"), and the included angle between adjacent teeth is 90°. When closed, with teeth fully intermeshed, the jaws exert a pressure of about 11952 kg/m$^2$ (17 psi) on the film located within the jaws.

For the purpose of the test the jaws are maintained at a temperature of 130° C., tubular film of lay-flat width less than 127 mm (5"), conveniently of the order of 63.5 mm (2.5"), is fed downwardly between the jaws under the influence of a small load, in the form of a weight attached to the film, and the jaws are operated to effect intermittent sealing across the width of the film at a rate of 25 seals per minute. The test is repeated with a series of differing weights attached to the film to determine the minimum load required to ensure that the film runs uniformly through the machine without adhering to the jaws when a seal is effected. For convenience, the minimum load, in grammes, is multiplied by a factor of 127/x, where x is the width, in mm, of the seal effected on the lay-flat film, to provide a value for the minimum loading required for a seal of width 127 mm (5"), corresponding to the dimensions of a "standard" bag. The resultant value, in grammes per 127 mm width, is the "degree of jaw sticking" of the film under test. In practice, the degree of jaw sticking is desirably less than 10 g/127 mm, and preferably less than 5 g/127 mm.

The multiple-layer films of the present invention are suitable for use in the packaging industry, particularly for the formation of flexible packages for foodstuffs and the like. They may, however, be employed in any other application for which a heat-sealable polyolefin film is required.

The invention is illustrated by reference to the accompanying drawings in which.

The test method employed to determine the hot seal strength of multiple-layer films according to the present invention is illustrated by reference to FIGS. 3 to 6 inclusive of the accompanying drawings in which.

Figure 1:
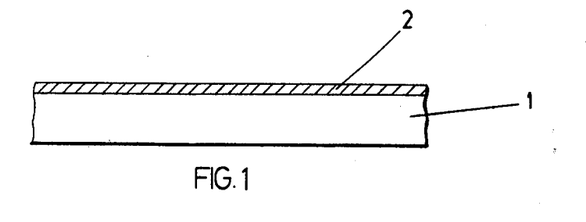
FIG. 1 depicts a side elevation of a portion of a propylene homopolymer base film 1 having a thin layer of a propylene/butene-1 copolymer 2 on one surface thereof.
Figure 2:
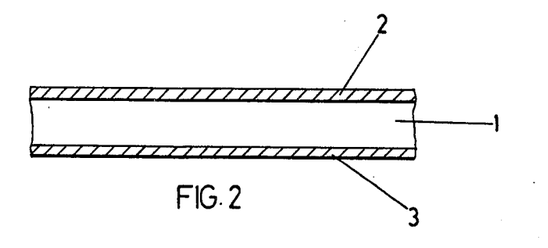
FIG. 2 depicts a side elevation of a similar substrate film 1 having a thin copolymer layer on both surfaces 2, 3 thereof.
Figure 3:
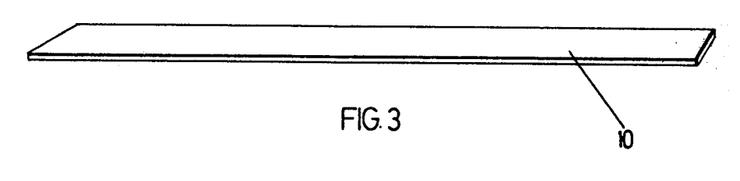
FIG. 3 is a perspective view of a long strip of spring steel.
Figure 4:
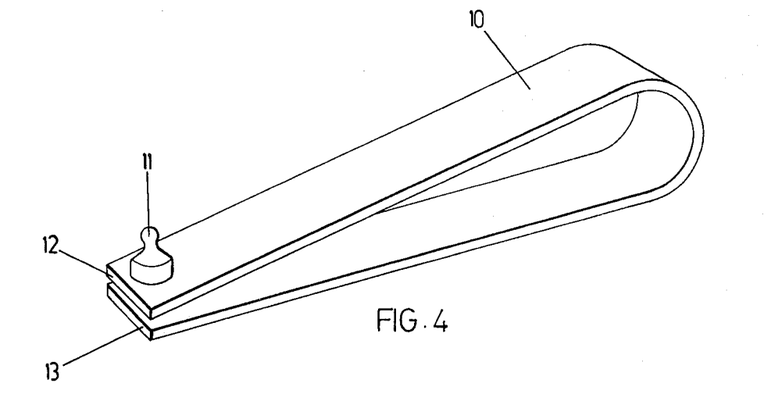
FIG. 4 is a perspective view of the strip of FIG. 3 being calibrated by the addition of weights.

Referring now to FIGS. 3 to 6, the hot seal strength of the films of the present invention is determined by means of a series of long strips of spring steel 10 of approximately 25 mm width. The length of each steel strip is selected so as to provide throughout the series of strips a gradation in the thrust energy exerted by a strip to separate the film layers of a newly created heat-seal, and may conveniently be in a range of from about 500 to about 1000 mm. Calibration of a spring steel strip is effected by folding the strip over upon itself about its mid-point, somewhat in the form of a "C" with elongated limbs, and gradually applying an increasing load in the form of weights 11 positioned on the uppermost limb adjacent the free end thereof until the free ends 12, 13 of the spring just make contact with each other (FIG. 4). If, for example, the required loading is 10 grammes, the spring is rated as a "10 gramme spring".

Figure 5:
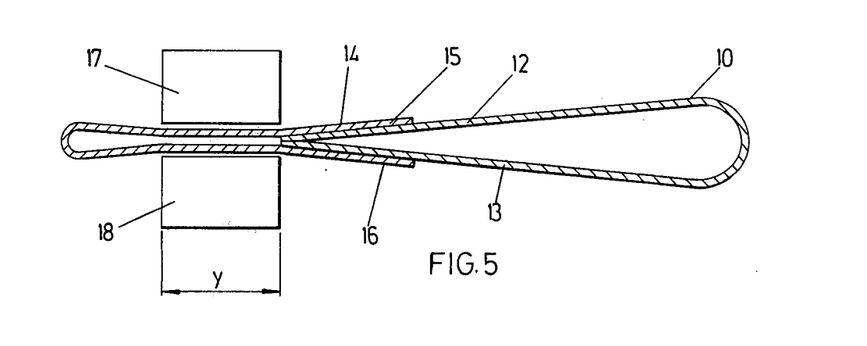
FIG. 5 is a side elevation showing the formation of a heat-seal between two opposed surfaces of a multiple-layer film attached to the free ends of the steel strip.

Referring to FIG. 5, a strip 14 of a multiple-layer film of the present invention having a width of 25 mm and a length of about 150 mm, is folded over upon itself so that the propylene copolymer surfaces thereof are in contact with each other, and the free ends 15, 16 of the film strip are secured by a suitable adhesive to the outermost surface of the free ends 12, 13 of a previously calibrated spring strip 10 which is maintained under manual compression so that the free ends of the spring strip remain in contact until the opposed surfaces of the film strip are sealed together between the heated jaws 17, 18 of a Sentinel Heat Sealer (Model No. 12AS), the free ends of the spring strip being positioned outside but immediately adjacent the edges of the sealing jaws. The depth "y" of jaws 17, 18 is 25 mm, so that a square heat-seal of side 25 mm is formed between the opposed surfaces of the film strip.

Figure 6:
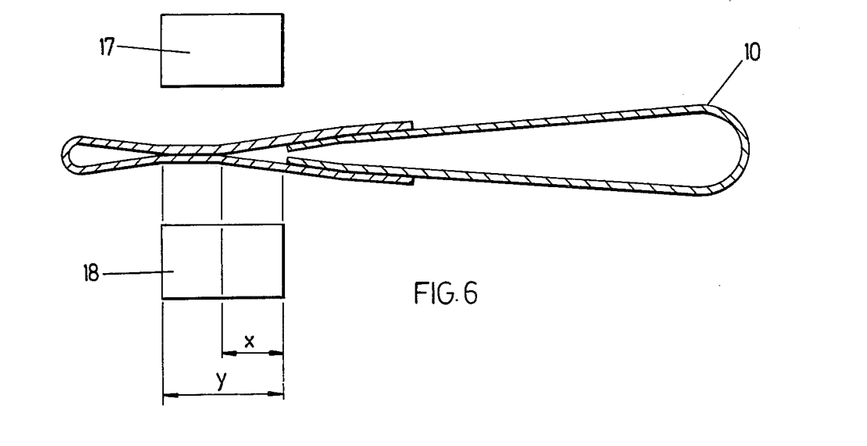
FIG. 6 is a side elevation showing the behaviour of the heat-sealed area of film on release of the applied sealing pressure.

Upon closure of sealing jaws 17, 18 the manual compression force is removed so that immediately upon retraction of the sealing jaws to the open position illustrated in FIG. 6, the free ends of the steel strip are allowed to spring apart thereby tending to rupture the newly created heat-seal. The depth "x" of the opening thereby induced in the seal provides a measure of the strength of the seal, the degree of seal opening being expressed in the form $\times 100/y$ %. The test procedure is then repeated on identical samples of film using in turn each of a series of calibrated spring strips of progressively increasing ratings.

In contrast to the hot seal strength which is determined before the thermal energy employed to form the heat-seal has dissipated, the heat-seal strength of the film is determined after the seal has cooled to ambient temperature, and the full potential strength of the seal has developed.

To determine the heat-seal strength, two strips of the multiple-layer film were placed with the propylene copolymer surfaces in contact with each other, and the ends of the strips sealed together between the jaws of a Sentinel Heat Sealer, Model No. 12AS, only one jaw of the unit being heated. The stength of the seal was measured by cutting from the sealed-together strips of film, which had been allowed to cool to ambient temperature, a strip 25 mm wide and some 100 mm long, the heat-seal extending across the entire width of the strip and having an area of some 25×25 mm. The unsealed ends of the strip were then attached respectively to a dynamometer and a gripping surface, a load was applied to the gripping surface, and the minimum load required to separate the strips in the sealed area was recorded by the dynamometer, and expressed as a seal strength of x g/25 mm, where x was the load in grammes.

The degree of adhesion between the copolymer layer and the substrate layer of the films of the present invention is assessed by measuring the force required to peel a strip, 10 mm wide, of the copolymer layer away from the supported film. By a supported film is meant a film which has been sandwiched between opposed strips of "Sellotape" adhesive tape, 25 mm wide, for one hour. At the expiry of one hour, a strip, 10 mm wide, is longitudinally excised from the "sandwich", and the "Sellotape" backing strip in contact with one surface of the film strip under test is adhered in a vertical position to a film holder attached to a dynamometer. The "Sellotape" layer adhering to the other, copolymer coated, surface of the film is then peeled away from the upper end of the strip, turned over through 180° and secured to a gripping member through which a tensile force is applied to remove the "Sellotape" layer, together with the copolymer layer, from the base film strip. The maximum force, measured in g/cm, required to remove the coating layer is registered by the dynamometer. If adhesion between the coating layer and substrate exceeds that between the coating layer and "Sellotape", then the coating cannot be removed by this technique and the test result is recorded as "no peel".

The invention is further illustrated by reference to the following Examples.

EXAMPLE 1

This example illustrates the production of a propylene/butene-1 copolymer for use as a heat-sealable layer on a multiple-layer film.

A stirred pressure vessel was charged with 280 gallons of dry hydrocarbon diluent (boiling point 150°–180° C.), and all traces of oxygen were removed by evacuation and purging with nitrogen. Then 23.7 mols of AlEt$_2$Cl (as a solution in 20 liters of diluent), and 13.2 mols of TiCl$_3$ (as a slurry in 20 liters of diluent) were added. This TiCl$_3$ was prepared by reducing TiCl$_4$ with ethyl aluminium sesquichloride as described in the Complete Specification of our British Pat. No. 1 014 944, with an aluminium diethyl chloride:titanium tetrachloride molar ratio of 0.9.

The autoclave was heated to 60° C. and 213 lb of propylene containing 0.16 mole % of hydrogen added over a period of 10 minutes. When the pressure had fallen to 32 psig (the pressure of inert gas in the reactor being 4.6 psig), 45 liters of butene were quickly introduced. Propylene, containing hydrogen, and butene were metered in together in a constant ratio so that a further 812 lb of propylene and 131 liters of liquid butene-1 were added over a period of 106 minutes. At this point the propylene feed rate was reduced to 74 lb/hour, and continued for a further hour, without any additional butene being charged, to allow the pressure to fall to 8.0 psig.

Catalyst residues were removed by injecting 55 liters of isopropanol and heating for 4 hours at 65° C. The resultant slurry, after washing with three successive 120 gallon lots of water, was filtered to remove most of the diluent. Steam distillation removed the remaining diluent to leave polymer particles which were filtered and dried in a rotary drier.

Approximately 1003 lb of a solid propylene/butene-1 copolymer was isolated from this reaction, the butene-1 content of the copolymer being 14% by weight.

The resultant dry, free-flowing powder had a Melt Flow Index, as hereinbefore defined, of approximately 32 g/10 minutes. The powder was then stabilized by the addition of 0.01% by weight, based on the weight of the copolymer, of 1,3,5-tri(3,5-ditertiarybutyl-4-hydroxybenzyl)2,4,6-trimethylbenzene, and 0.15% by weight of calcium stearate, and converted into granules of cylindrical shape by extrusion from an extruder with a barrel diameter of 83 mm maintained at a temperature of 250° C. The Melt Flow Index of the resultant granules was approximately 65 g/10 minutes.

The degree of crystallinity of the copolymer, as hereinbefore defined, was approximately 50%, the crystalline content comprising approximately 52% of the alpha modification and 48% of the gamma modification.

EXAMPLE 2

From a triple channel annular die were coextruded a propylene homopolymer, and a propylene/butene-1 random copolymer containing 14% by weight of butene-1 and made according to Example 1, so as to form a polypropylene tube the internal and external surfaces of which were coated with a layer of the propylene/butene-1 copolymer. The propylene homopolymer contained, as anti-oxidant, 0.1% by weight of 1,3,5-tri(3,5-ditertiarybutyl-4-hydroxybenzyl)2,4,6-trimethylbenzene.

The coated polypropylene tube was cooled by passage over a mandrel with the tube, and externally quenched by passage through a water bath surrounding the mandrel, heated to stretching temperature, expanded by internal gas pressure, and withdrawn from the expansion zone at a rate greater than that at which it was fed thereto, so that the tube was stretched to seven times its original dimensions in both the direction of extrusion and in a direction transverse thereto.

The stretched tubular film was then opened out to form flat film which was subsequently heat-set on a stenter system, the film being held under tension at a temperature of 135° C. for approximately 10 seconds. The thickness of the copolymer layer on each surface of the resultant film was 1 micron, the substrate having a thickness of about 14 microns.

X-ray examination of layers peeled from the film indicated that the crystalline structure of both the substrate and surface layers was substantially entirely of the alpha or monoclinic modification.

To assess the heat-seal threshold temperature, i.e. the lowest heat-sealing temperature at which seals of acceptable strength are obtained, a series of samples of the copolymer coated film was heat-sealed at progressively increasing temperatures using a Sentinel Heat Sealer, Model No. 12AS, and the heat-seal strengths of the resultant seals determined as hereinbefore described.

The heat-seal strengths obtained for various jaw sealing temperatures are recorded in the following Table.

These seals were effected between strips of film so positioned that the copolymer surfaces which formed the external surface of the extruded tube were in contact with each other.

| Jaw Sealing Temperature °C. | Heat-Seal Strength g/25 mm |
|---|---|
| 90 | 0 |
| 100 | 300 |
| 110 | 540 |
| 120 | 520 |
| 130 | 460 |

EXAMPLE 3

The procedure of Example 2 was repeated, but instead of heat-setting the film by means of a stenter system, the film was heat-set by securing a film sample in a frame to control shrinkage of the film, and placing the frame in an air oven for a period of thirty seconds. The heat-setting temperature was 135° C., as in Example 2, but the duration of the heat-setting operation was approximately three times that of Example 2.

The heat-seal strengths obtained are recorded in the following Table.

| Jaw Sealing Temperature °C. | Heat-Seal Strength g/25 mm |
|---|---|
| 90 | 100 |
| 100 | 580 |
| 110 | 580 |
| 120 | 630 |
| 130 | 560 |

These results show that seals of greater strength are obtained at lower sealing temperatures, as a result of increasing the duration of the heat-setting operation.

EXAMPLE 4

To illustrate the effect of decreasing the content of butene-1 in the copolymer layer the procedure of Example 2 was repeated to prepare two multiple-layer films provided respectively with a propylene copolymer layer in which the content of butene-1 was 14 and 11% by weight of the copolymer.

The results obtained were as follows:

| Jaw Sealing Temperature °C. | Heat-Seal Strength g/25 mm | |
|---|---|---|
| | Propylene/butene-1 (86:14) | Propylene/butene-1 (89:11) |
| 90 | 0 | 0 |
| 100 | 300 | 0 |
| 110 | 540 | 0 |
| 120 | 520 | 0 |
| 130 | 460 | 40 |
| 135 | 530 | 260 |
| 140 | 520 | 520 |

The decrease in seal strength, at a given sealing temperature, on reduction of the butene-1 content of the copolymer is evident from the above results. In fact, the threshold sealing temperature rises as the content of butene-1 is decreased.

X-ray examination of both films revealed no trace of hexagonal or triclinic crystal modifications, the crystalline content being substantially entirely of the monoclinic modification.

EXAMPLE 5

To illustrate the effect of increasing the heat-setting temperature, the procedure of Example 2 was repeated using a copolymer layer containing 89% by weight of propylene and 11% by weight of butene-1. Samples of the resultant film were stenter heat-set at 135° and 160° respectively.

The results obtained were as follows:

| Jaw Sealing Temperature °C. | Heat-Seal Strength g/25 mm | |
|---|---|---|
| | Film heat-set at 135° C. | Film heat-set at 160° C. |
| 120 | 0 | 30 |
| 125 | 0 | 150 |
| 130 | 40 | 540 |
| 135 | 260 | 570 |
| 140 | 520 | — |

The improvement in seal strength, at a given sealing temperature, obtained by heat-setting the film at a higher temperature is evident from the above results.

EXAMPLE 6

To illustrate the adhesion and resistance to jaw sticking of multiple-layer films according to the present invention a layer of a copolymer containing 88% by weight of propylene and 12% by weight of butene-1 was applied by various techniques to a series of propylene homopolymer films. The applied layers had an average thickness of 1 micron.

The adhesion of the copolymer layer to the substrate layer, and the degree of jaw sticking were assessed by the test methods hereinbefore described.

Results are shown in the accompanying Table.

| Application of layer | Substrate Thickness microns | Adhesion g/cm | Degree of Jaw Sticking g/127 mm | Heat-Seal Strength 130° C. g/25 mm |
|---|---|---|---|---|
| 2% by wt in trichloroethylene | 14 | no peel | 0 | 200 |
| 10% by wt in trichloroethylene | 17 | 85 | 0 | 200 |
| 2% by wt in cyclohexane | 14 | no peel | 0 | not measured |
| coextruded melt | 18 | no peel | 0 | 500 |

EXAMPLE 7

This Example illustrates the jaw sticking tendencies, measured as hereinbefore defined, of a number of conventional heat-sealable materials, each in the form of a layer of 1 micron thickness on a propylene homopolymer substrate of approximately 14 microns thickness.

| Layer | | Degree of Jaw Sticking g/127 mm |
|---|---|---|
| Material | Applied as | |
| Polyethylene (density: 0.96 g/cm³) | coextruded melt | >50 |
| Polyethylene (density: 0.93 g/cm³) | coextruded melt | 35 |
| 50:50 (wt) propylene/ | 10% (wt) solution | |

-continued

| Layer | | Degree of Jaw Sticking |
|---|---|---|
| Material | Applied as | g/127 mm |
| butene-1 copolymer* | in trichloro-ethylene | >40 |
| 75:25 (wt) propylene/butene-1 copolymer* | 10% (wt) solution in trichloro-ethylene | 10 |
| 88:12 (wt) propylene/butene-1 copolymer** | 10% (wt) solution in trichloro-ethylene | 0 |
| 88:12 (wt) propylene/butene-1 copolymer** | coextruded melt | 0 |

Catalysed by titanium trichloride: dichloroethyl-aluminum: hexamethylphosphoramide in a ratio by weight of 1:0.79:0.72.
**This invention.

EXAMPLE 8

The procedure of Example 2 was repeated except that the propylene/butene-1 copolymer contained 12% by weight of butene-1 and 88% by weight of propylene (total crystalline content 50%; alpha:gamma ratio 52:48), and that heat-setting of the film was effected at 125° C. on a matt-surfaced roller heat-setter of the kind described in British Pat. No. 1 124 886. The resultant propylene homopolymer film substrate of 25 microns thickness had a layer of the propylene/butene-1 copolymer of 1 micron thickness on each surface.

Samples of the film were heat-sealed on a Sentinel Heat Sealer, Model No. 12AS, operating at a jaw temperature of 140° C., jaw pressure of 15 psi, and jaw closure time of 2 seconds. The hot seal strength of the resultant seals was determined, as hereinbefore described, using a series of steel strip springs rated respectively at 10, 30, 60 and 100 grammes. Results obtained are recorded in the accompanying Table.

TABLE

| Spring Rating grammes | Hot Seal Strength % opening |
|---|---|
| 10 | 100 |
| 30 | 100 |
| 60 | 100 |
| 100 | 100 |

X-ray examination of the oriented film revealed no trace of hexagonal or triclinic crystallinity, the crystalline content of the respective layers of the multiple-layer being substantially entirely of the monoclinic form.

EXAMPLE 9

The procedure of Example 8 was repeated except that the thickness of the applied copolymer layer was 0.7 micron. Results obtained are recorded in the accompanying Table.

TABLE

| Spring Rating grammes | Hot Seal Strength % opening |
|---|---|
| 10 | — |
| 30 | 100 |
| 60 | 100 |
| 100 | 100 |

EXAMPLE 10

The procedure of Example 8 was repeated except that the thickness of the applied copolymer layer was 0.34 micron. Results obtained are recorded in the accompanying Table.

TABLE

| Spring Rating grammes | Hot Seal Strength % opening |
|---|---|
| 10 | — |
| 30 | 20 |
| 60 | 70 |
| 100 | 100 |

EXAMPLE 11

The procedure of Example 8 was repeated except that the thickness of the applied copolymer layer was 0.25 micron. Results obtained are recorded in the accompanying Table.

TABLE

| Spring Rating grammes | Hot Seal Strength % opening |
|---|---|
| 10 | — |
| 30 | 5 |
| 60 | 20 |
| 100 | 25 |

EXAMPLE 12

The procedure of Example 8 was repeated except that the thickness of the applied copolymer layer was 0.18 micron. Results obtained are recorded in the accompanying Table.

TABLE

| Spring Rating grammes | Hot Seal Strength % opening |
|---|---|
| 10 | — |
| 30 | 0 |
| 60 | 0 |
| 100 | 20 |

EXAMPLE 13

The procedure of Example 8 was repeated except that the non-seal-forming surface of the multiple-layer film was subjected to a corona discharge treatment by means of a Lepel High Frequency Oscillator, Model HFSG-6A, prior to formation of the heat-seal. The thickness of the copolymer was 1 micron. Results obtained are recorded in the accompanying Table.

TABLE

| Spring Rating grammes | Hot Seal Strength % opening |
|---|---|
| 10 | 100 |
| 30 | 100 |
| 60 | 100 |
| 100 | 100 |

EXAMPLE 14

The procedure of Example 13 was repeated except that the thickness of the applied copolymer layer was 0.7 micron. Results obtained are recorded in the accompanying Table.

TABLE

| Spring Rating grammes | Hot Seal Strength % opening |
|---|---|
| 10 | 100 |
| 30 | 100 |
| 60 | 100 |
| 100 | 100 |

EXAMPLE 15

The procedure of Example 13 was repeated except that the thickness of the applied copolymer layer was 0.34 micron. Results obtained are recorded in the accompanying Table.

TABLE

| Spring Rating grammes | Hot Seal Strength % opening |
|---|---|
| 10 | 100 |
| 30 | 100 |
| 60 | 100 |
| 100 | 100 |

EXAMPLE 16

The procedure of Example 13 was repeated except that the thickness of the applied copolymer layer was 0.25 micron. Results obtained are recorded in the accompanying Table.

TABLE

| Spring Rating grammes | Hot Seal Strength % opening |
|---|---|
| 10 | 100 |
| 30 | 100 |
| 60 | 100 |
| 100 | 100 |

EXAMPLE 17

The procedure of Example 13 was repeated except that the thickness of the applied copolymer layer was 0.18 micron. Results obtained are recorded in the accompanying Table.

TABLE

| Spring Rating grammes | Hot Seal Strength % opening |
|---|---|
| 10 | 0 |
| 30 | 0 |
| 60 | 65 |
| 100 | 100 |

EXAMPLE 18

Correlation between the hot seal strength measured by means of the steel spring strip test hereinbefore described, and that obtained on a conventional packaging machine was assessed using a Hansella, Model 175C., vertical "form and fill" packaging machine operating to form a succession of horizontal crimp seals of 14 mm depth in a tubular film having a width in the collapsed or "lay-flat" form of 125 mm. The crimp jaws were of 190 mm width, 14 mm depth, and had 7 teeth per cm of width, the included angle between adjacent teeth being 90°.

Using in turn the films of Examples 9 to 12, a series of packages are formed on the Hansella machine at a rate of 66 packages per minute, the contents charged to each package being 200 grammes of toffee confectionery. Introduction of the charge of toffees tends to disrupt the newly formed lower heat-seal of the package in question, and the percentage opening of the seal both width- and depth-wise is recorded in the accompanying Table.

TABLE

| Film of Example No. | Copolymer Layer Thickness (μm) | Hot Seal Strength Seal Opening % | | | | | |
|---|---|---|---|---|---|---|---|
| | | Spring Rating | | | | Hansella | |
| | | 10g | 30g | 60g | 100g | Width | Depth |
| 9 | 0.70 | — | 100 | 100 | 100 | 90 | 60 |
| 10 | 0.34 | — | 20 | 70 | 100 | 70 | 35 |
| 11 | 0.25 | — | 5 | 20 | 25 | 45 | 10 |
| 12 | 0.18 | — | 0 | 0 | 20 | 40 | 10 |

EXAMPLE 19

The procedure of Example 18 was repeated, using in turn the film of Examples 14 to 17, the packages being formed on the Hansella 175C at a rate of 50 per minute. Correlation between the steel spring test of hot seal strength and results obtained with the Hansella packaging machine are illustrated in the accompanying Table.

TABLE

| Film of Example No. | Copolymer Layer Thickness (μm) | Hot Seal Strength Seal Opening % | | | | | |
|---|---|---|---|---|---|---|---|
| | | Spring Rating | | | | Hansella | |
| | | 10g | 30g | 60g | 100g | Width | Depth |
| 14 | 0.70 | 100 | 100 | 100 | 100 | 90 | 60 |
| 15 | 0.34 | 100 | 100 | 100 | 100 | 70 | 55 |
| 16 | 0.25 | 100 | 100 | 100 | 100 | 85 | 55 |
| 17 | 0.18 | 0 | 0 | 65 | 100 | 20 | 10 |

EXAMPLES 20 to 24

To illustrate the effect on hot seal strength of reducing the temperature at which the seal is formed, the procedure of Examples 8 to 12 was repeated on a series of samples of a propylene homopolymer substrate of 25 microns thickness provided with a layer of a propylene/butene-1 copolymer (88:12 by weight), the thickness of the copolymer layer decreasing progressively throughout the series, as shown in the accompanying Table. The jaw temperature of the Sentinel Heat Sealer was 130° C., compared to 140° C. for Examples 8 to 12, and the hot seal strength of the resultant seals was assessed by the spring strip test, as hereinbefore described.

In addition, the heat-seal strength (at ambient temperature) of seals formed at different jaw sealing temperatures was measured by the dynamometer technique as hereinbefore described.

The results are recorded in the accompanying Table.

TABLE

| Example No. | Copolymer Layer Thickness (μm) | Hot Seal Strength % opening | | | Cold Seal Strength g/25 mm | | |
|---|---|---|---|---|---|---|---|
| | | Spring Rating | | | | | |
| | | 30g | 60g | 100g | A | B | C |
| 20 | 0.70 | 100 | 100 | 100 | 230 | 300 | 450 |
| 21 | 0.34 | 85 | 85 | 100 | 350 | 460 | 510 |
| 22 | 0.25 | 0 | 35 | 40 | 250 | 300 | 300 |
| 23 | 0.18 | 0 | 35 | 20 | 150 | 275 | 350 |

TABLE-continued

| Example No. | Copolymer Layer Thickness (μm) | Hot Seal Strength % opening Spring Rating | | | Cold Seal Strength g/25 mm | | |
|---|---|---|---|---|---|---|---|
| | | 30g | 60g | 100g | A | B | C |
| 24 | 0.17 | 0 | 20 | 20 | 250 | 300 | 530 |

A = jaw sealing temperature 110° C.
B = jaw sealing temperature 120° C.
C = jaw sealing temperature 130° C.

EXAMPLES 25 to 29

The procedure of Examples 20 to 24 was repeated except that the thickness of the polypropylene substrate was 20 microns, instead of 25 microns, and that there were minor differences in the thickness of the applied copolymer layers.

Results obtained are recorded in the accompanying Table.

TABLE

| Example No. | Copolymer Layer Thickness (μm) | Hot Seal* Strength % opening Spring Rating | | | Cold Seal** Strength g/25 mm |
|---|---|---|---|---|---|
| | | 40g | 60g | 100g | |
| 25 | 0.86 | 100 | 100 | 100 | 415 |
| 26 | 0.51 | 40 | 100 | 85 | 415 |
| 27 | 0.46 | 10 | 20 | 25 | 450 |
| 28 | 0.25 | 0 | 0 | 15 | 210 |
| 29 | 0.16 | 100 | 100 | 100 | 50 |

*/**jaw sealing temperature 130° C.

EXAMPLES 30 to 34

The procedure of Examples 25 to 29 was repeated except that the jaw sealing temperature was raised from 130° to 140° C. Results obtained are recorded in the accompanying Table.

TABLE

| Example No. | Copolymer Layer Thickness (μm) | Hot Seal Strength % opening Spring Rating | | |
|---|---|---|---|---|
| | | 40g | 60g | 100g |
| 30 | 0.86 | 15 | 30 | 40 |
| 31 | 0.51 | 10 | 50 | 40 |
| 32 | 0.46 | 5 | 15 | 35 |
| 33 | 0.25 | 0 | 0 | 15 |
| 34 | 0.16 | 5 | 15 | 15 |

We claim:
1. An oriented, multiple-layer film comprising
(a) a substrate layer of a polymer selected from the group consisting of,
  (1) high density polyethylene,
  (2) a propylene homopolymer, and
  (3) a copolymer of propylene with up to 15% by weight of the copolymer of an alpha-olefin containing 2 or 4 to 6 carbon atoms in its molecule, and
(b) on at least one surface of the substrate, a heat-sealable layer of a substantially random copolymer of propylene and an alpha-olefin containing from 4 to 10 carbon atoms in its molecule, the propylene content of said heat-sealable copolymer being from 80 to 95% by weight of the copolymer,
wherein the crystalline content of each of said propylene homo- or co-polymers forming respectively the substrate and heat-sealable layer, or layers, is of monoclinic crystalline form, and
wherein the heat-sealable propylene copolymer in granular form prior to the formation of a film layer therefrom has a Melt Flow Index of from 10 to 400 g/10 minutes.

2. A film according to claim 1 wherein the alpha-olefin component of the heat-sealable propylene copolymer layer is butene-1.

3. A film according to claim 2 wherein the butene-1 content of the heat-sealable propylene copolymer layer is from 10 to 15% by weight of the copolymer.

4. A film according to claim 1 wherein the heat-sealable propylene copolymer layer comprises a copolymer which, prior to incorporation into the multiple-layer film, exhibits a degree of crystallinity of from 35 to 65%.

5. A film according to claim 1 wherein the thickness of the heat-sealable propylene copolymer layer on a surface of the substrate layer does not exceed 0.5 micron.

6. A film according to claim 5 wherein the thickness of the heat-sealable propylene copolymer layer is from 0.05 to 0.25 micron.

7. A coextruded, oriented, multiple-layer film comprising
(a) a substrate layer of a polymer selected from the group consisting of,
  (1) high density polyethylene,
  (2) a propylene homopolymer, and
  (3) a copolymer of propylene with up to 15% by weight of the copolymer of an alpha-olefin containing 2 or 4 to 6 carbon atoms in its molecule, and
(b) simultaneously coextruded with, and on at least one surface of, the substrate,
  a heat-sealable layer of a substantially random copolymer of propylene and an alpha-olefin containing from 4 to 10 carbon atoms in its molecule, the propylene content of said heat-sealable copolymer being from 80 to 95% by weight of the copolymer,
wherein the crystalline content of each of said propylene homo- or co-polymers forming respectively the substrate and heat-sealable layer, or layers, is of monoclinic crystalline form, and
wherein the heat-sealable propylene copolymer in granular form prior to the formation of a film layer therefrom has a Melt Flow Index of from 10 to 400 g/10 minutes.

8. An oriented, multiple-layer film comprising
(a) a substrate layer of a polymer selected from the group consisting of,
  (1) high density polyethylene,
  (2) a propylene homopolymer, and
  (3) a copolymer of propylene with up to 15% by weight of the copolymer of an alpha-olefin containing 2 or 4 to 6 carbon atoms in its molecule, and
(b) on at least one surface of the substrate, a heat-soluble layer of a substantially random copolymer of propylene and an alpha-olefin containing from 4 to 10 carbon atoms in its molecule, the propylene content of said heat-sealable copolymer being from 80 to 95% by weight of the copolymer,
wherein the crystalline content of each of said propylene homo- or co-polymers forming respectively the substrate and heat-sealable layer or layers, is of the same crystalline form, and
wherein the heat-sealable propylene copolymer is granular form prior to the formation of a film layer therefrom has a Melt Flow Index of from 10 to 400 g/10 minutes.

* * * * *